United States Patent [19]

Lee

[11] Patent Number: 5,549,284
[45] Date of Patent: Aug. 27, 1996

[54] HYDRAULICALLY CONTROLLED ENGINE MOUNTING DEVICE OF AN AUTOMOTIVE VEHICLE

[75] Inventor: Hyosang Lee, Kyungsangnam-do, Rep. of Korea

[73] Assignee: Hyundai Motor Company, Seoul, Rep. of Korea

[21] Appl. No.: 339,212

[22] Filed: Nov. 10, 1994

[30] Foreign Application Priority Data

Nov. 10, 1993 [KR] Rep. of Korea ............... 93-23808

[51] Int. Cl.$^6$ ............... F16M 5/00; F16F 15/00
[52] U.S. Cl. ............... 267/140.14; 267/218; 248/550; 248/562; 248/636
[58] Field of Search ............... 248/550, 636, 248/638, 559, 901, 562, 634, 659; 267/140.13, 140.14, 219, 218, 140.11

[56] References Cited

U.S. PATENT DOCUMENTS

| | | | |
|---|---|---|---|
| 4,648,576 | 3/1987 | Matsui | 248/550 |
| 4,664,360 | 5/1987 | Sciortino | 267/140.13 |
| 4,793,599 | 12/1988 | Ishioka | 267/140.1 |
| 4,828,234 | 5/1989 | Hoying et al. | 267/140.1 |
| 4,901,986 | 2/1990 | Smith | 267/140.1 |
| 4,997,169 | 3/1991 | Nakamura et al. | 267/140.1 |
| 5,215,294 | 6/1993 | Muramatsu et al. | 267/140.13 |

Primary Examiner—Karen J. Chotkowski
Assistant Examiner—Anita M. King
Attorney, Agent, or Firm—Birch Stewart Kolasch and Birch LLP

[57] ABSTRACT

A hydraulically controlled engine mounting device for mounting an engine to a body of a vehicle, includes a plurality of hydraulic pressure chambers controlled by a single solenoid valve for effectively reducing vibrations at most frequency vibrations. More particularly, the invention includes first and second hydraulic pressure rooms divided by a partition and communicating with each other by a passageway to dampen vibration of an engine with a fluid friction. A third hydraulic pressure room is formed near the first hydraulic pressure room, the third hydraulic pressure room communicating with the first hydraulic pressure room by a passage-aperture having a solenoid valve. A hydraulic pump is formed in a predetermined position within the third hydraulic pressure room, the solenoid valve and hydraulic pump being operated by a controller judging a vibration frequency transmitted to a vehicle body to charge an internal hydraulic pressure of the first hydraulic pressure room and dampen the vibration transmitted to the body.

10 Claims, 2 Drawing Sheets

HYDRAULICALLY CONTROLLED ENGINE MOUNTING DEVICE OF AN AUTOMOTIVE VEHICLE

BACKGROUND OF THE INVENTION

1. Field of the Invention

The present invention relates to a hydraulically controlled engine mounting device for an automotive vehicle and more particularly, to a hydraulically controlled engine mounting device interposed between an engine and a body of an automotive vehicle, the device having plural hydraulic pressure chambers controlled by a single solenoid valve.

2. Description of the Prior Art

A hydraulically controlled engine mounting device of an automotive vehicle not only fixes and supports the engine but also prevents the vibration of the engine from being transmitted to the vehicle body.

The hydraulically controlled engine mounting device comprises an orifice between two hydraulic pressure rooms, and a fluid filled in the above hydraulic pressure rooms generates a fluid friction when passing through the above orifice by the vibration transmitted from the engine, whereby the vibration of the engine is damped.

At this time, the damping effect of the vibration depends on the length and the sectional area of the orifice interposed between two hydraulic pressure rooms.

However, since a lower frequency and a higher frequency of a vibration damp each other, the hydraulically controlled engine mounting device is generally designed so as to preponderantly damp the vibration of the lower frequency on the planning phase.

In such a case, the slight-vibration of the higher frequency not damped increases a dynamic spring constant of the engine mounting device, whereby the restraining effect of the transmission of the vibration is deteriorated.

To solve the above problem, there are some methods in which two groups respectively having a pair of the hydraulic pressure rooms are made, the first group being designed for the lower frequency and the second group being for the higher frequency, and then two groups of the hydraulic pressure rooms are selectively operated according to discrimination of the frequency of the vibration transmitted to the body, whereby the vibration is damped in all areas of the frequency of the vibration, and that a diaphragm is mounted inside the hydraulic pressure room and the vibration transmitted from the engine by the vibration of the diaphragm is offset.

However, the former has a problem that a structure of the engine equipping device is complex, and at the same time, a volume is enlarged, and in case of the latter, the damping effect of the vibration is not good.

SUMMARY OF THE INVENTION

Accordingly, it is an object of the present invention to provide a hydraulically controlled engine mounting device designed to have a damping effect of the vibration in all areas of frequency.

According to the above object, the present invention comprises first and second hydraulic pressure rooms divided by a partition, a passageway between two hydraulic pressure rooms to link two hydraulic pressure rooms, and a third hydraulic pressure room made near to the first hydraulic pressure room wherebetween a passageway in which a solenoid valve is mounted is made and links the first and third rooms.

At the same time, a hydraulic pump is placed at a predetermined position in the above third hydraulic pressure room, a frequency of the vibration transmitted to a body is sensed by a controller, the above solenoid valve and hydraulic pump are operated and a hydraulic pressure inside the above first hydraulic pressure room is changed, whereby the vibration is damped.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description,

BRIEF DESCRIPTION OF THE DRAWINGS

This invention can be more fully understood from the following detailed description when taken in conjunction with the accompanying drawings, wherein.

DETAILED DESCRIPTION OF THE PREFERRED EMBODIMENTS

Figure 1:
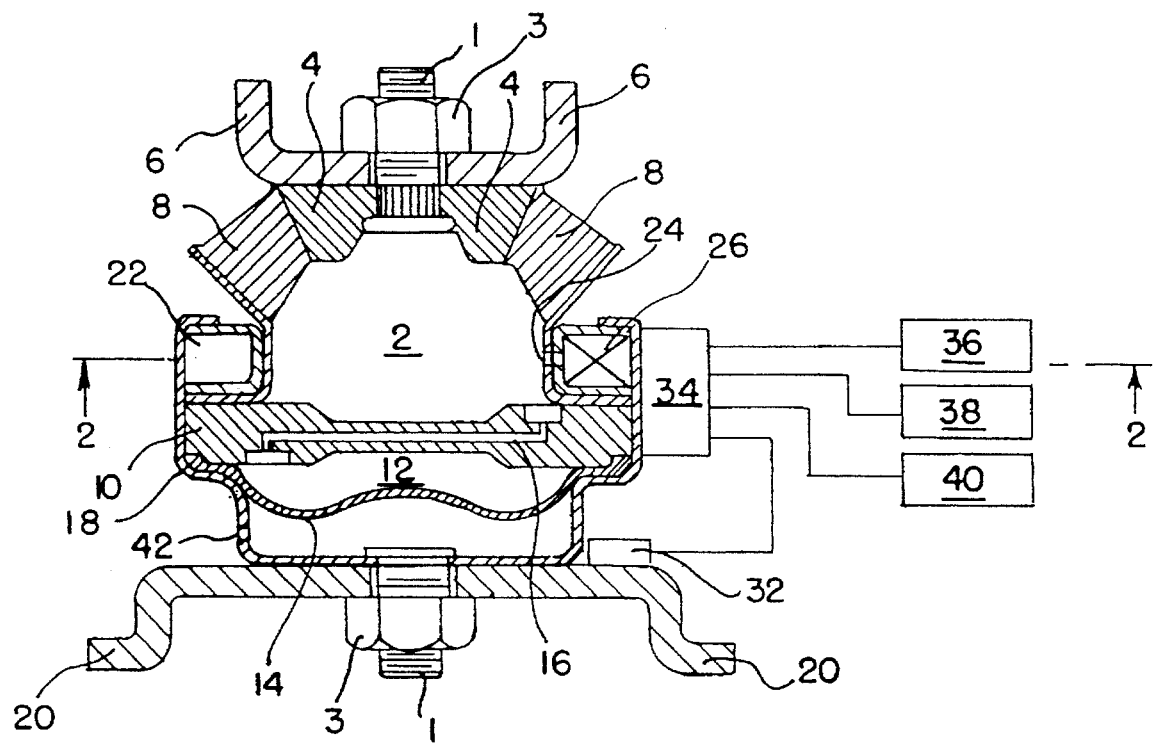
FIG. 1 is a schematic sectional side view of a structure of a hydraulically controlled engine mounting device according to a preferred embodiment of the present invention.
Figure 2:
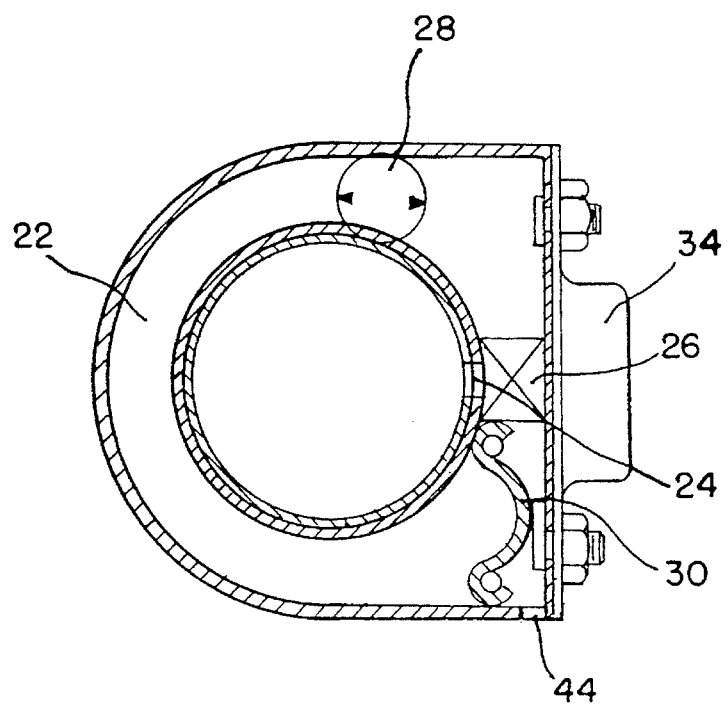
FIG. 2 is a horizontal sectional view as taken along line 2—2 of FIG. 1.

Referring now in detail to the drawings for the purpose of illustrating preferred embodiments of the present invention, the hydraulically controlled engine mounting device as shown in FIGS. 1 and 2, comprises a lower support piece 20 fixed to the car body and an upper support piece 6 fixed to the car engine by a bolt 1 and a nut 3, respectively, a first hydraulic pressure chamber 2, a second hydraulic pressure chamber 12 positioned below the first hydraulic pressure chamber 2, and a third hydraulic pressure chamber 22 encircling the first hydraulic pressure chamber 2.

An intermediate supporting piece 4 as a main casing is provided with an elastomeric rubber gasket absorbing member 8 positioned on an upper surface of the first hydraulic pressure chamber 2 for reducing vibrations as a buffer. A separating plate 10 is formed between the first and second hydraulic pressure chambers 2 and 12. The separating plate 10 has a channel 16 disposed therethrough for fluidly connecting the first and second hydraulic pressure chambers 2 and 12.

The second hydraulic pressure chamber 12 is provided with a first diaphragm 14 disposed therein for variably accommodating a hydraulic pressure within the second hydraulic pressure chamber 12 by limiting the space thereof.

A second diaphragm 30 is formed in the third hydraulic pressure chamber 22 for variably accommodating a hydraulic pressure within the third hydraulic pressure chamber 22 by limiting the space thereof. Also, the second diaphragm 30 has a second air hole 44 for properly operating by itself (FIG. 2).

A shield or seal member 18 is mounted to the lower support piece 20 and encapsulates the second diaphragm 30, the separating plate 10 and the first, second, and third hydraulic pressure chambers 2, 12, and 22 such that the separating plate 10 is held between the third hydraulic pressure chamber 22 and the first diaphragm 14. The first diaphragm 14 is held between the separating plate 10 and an inner support rim of the seal member 18, the seal member 18 having a first air hole 42 formed therein on an opposing side of the first diaphragm 14 from the separating plate 10 (FIGS. 1 and 2). The third hydraulic pressure chamber 22 is provided with a hydraulic pressure pump 28 disposed therewithin and the hydraulic pressure pump 28 is preferably a bidirectional type.

A solenoid valve 26 is formed in the third hydraulic pressure chamber 22 and includes a normally opened valve for supplying hydraulic pressure from the hydraulic pressure pump 28 to the first hydraulic pressure chamber 2 through an orifice 24 for fluidly connecting the first and third hydraulic pressure chambers 2 and 22. The orifice 24 is opened and closed by operation of the solenoid valve 26. Preferably, the solenoid valve 26 is a constant-open type valve.

A vibration sensor 32 is disposed on the lower support piece 20 relative to the car body. Also, a controller 34 is provided for controlling the hydraulic pump 28 and the solenoid valve 26 in response to at least a frequency of vibration signal detected by the vibration sensor 32 for sensing a vibration.

Furthermore, the controller 34 receives an information signal representative of the input of number E of the engine revolution from an engine control unit ECU 36, an information signal T about the position of speed ratio from the transmission control unit TCU 38, car speed V of the speedometer 40 and transmission stage of the transmission controller, and treats the data input by the vibration sensor 32 as an electric signal. According to the result, the solenoid valve 26 and the hydraulic pressure pump 28 operates properly.

Figure 3:
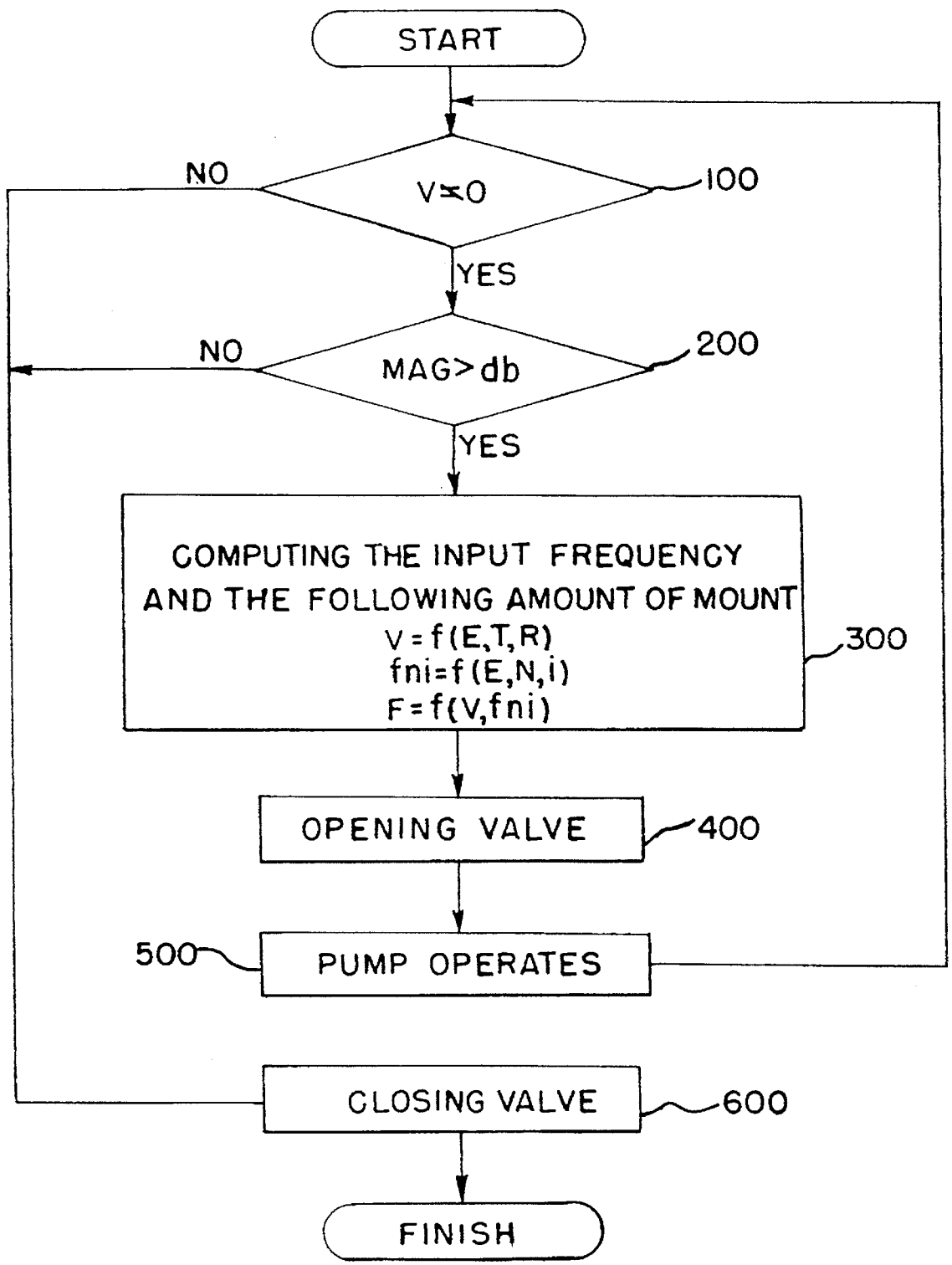
FIG. 3 is a flow chart to show an example of the operation of the hydraulically controlled engine equipping device according to the preferred embodiment of the present invention.

The hydraulically controlled engine mounting device according to the present invention operates as follows. As shown in FIG. 3, first of all, in a first stage 100, when the car speed V is over 0, the car is driving and it goes to a second stage 200. In the second stage 200, when a numerical value MAG of vibrations is larger than a reducing target or target damping valve dB, reducing or vibration damping is required and a third stage 300 is performed to damp the vibration.

In the third stage 300, inputting frequency fni and fluid amount P needed to reduce vibration are determined. At this time, the car speed V is proportioned to the engine revolution number E, the transmission stage number T and the girth R of the tire, and the inputting frequency fni is proportioned to the engine revolution number E, the number N of cycles and the stage i of engine vibration according to cylinder stages.

When the fluid amount P is determined, in a fourth stage 400, the controller 34 renders the solenoid valve 26 operative and in a fifth stage 500, renders the hydraulic pressure pump 28 operative such that they compensate for a high or low fluid pressure in the first hydraulic pressure chamber 2. In detail, if the fluid pressure in the first hydraulic pressure chamber 2 is decreased, the vibration reducing effect of a high frequency field appears, and oppositely, if the fluid pressure in the first hydraulic pressure chamber 2 is increased, the vibration reducing effect of a low frequency field appears.

Such a controlling stage is repeated continually during driving of the car. However, when the car stops, the stage proceeds to a sixth stage 600 from the first stage 100 or the second stage 200 and then the solenoid valve is closed. Thereafter, if the source of electric power connected to the controller 34 is cut off, the solenoid valve 26 is opened again and the fluid pressure in the first, second, and third hydraulic pressure chambers 2, 12, and 22 is returned to an original state by elasticity of the first and second diaphragms 12 and 30.

Accordingly, a supply of hydraulic pressure to the third hydraulic pressure chamber 22 is proportionately supplied to the first and second hydraulic fluid chambers 2 and 12 thereby dampening an engine vibration from the lower support piece 20 to the upper support piece 6.

Variations in hydraulic fluid supplied to the second and third hydraulic pressure chambers 12 and 22 bidirectionally compensate for the supply of hydraulic fluid pressure to the first hydraulic pressure chamber 2 such that the first hydraulic pressure chamber 2 dampens an engine vibration from the lower support piece 20 to the upper support piece 6.

Besides, the hydraulically controlled engine mounting device according to the present invention is simple in structure, compact for portability, inexpensive to manufacture, easy to use and assemble with the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulically controlled engine mounting device, said device comprising:

a lower support piece adapted to be fixed to a body portion of a vehicle;

an upper support piece adapted to be fixed to an engine of the vehicle;

a first hydraulic pressure chamber positioned between said lower support piece and said upper support piece;

a second hydraulic pressure chamber positioned below said first hydraulic pressure chamber;

a first diaphragm formed in said second hydraulic pressure chamber for variably accommodating a hydraulic pressure within said second chamber;

a separating plate formed between said first and second hydraulic pressure chambers, said separating plate having a channel formed therethrough for fluidly connecting said first and second hydraulic pressure chambers;

a third hydraulic pressure chamber encircling said first hydraulic pressure chamber;

a second diaphragm formed in said third hydraulic pressure chamber for variably accommodating a hydraulic pressure within said third hydraulic pressure chamber;

means for fluidly connecting said first and third hydraulic pressure chambers;

a hydraulic pump housed within said third hydraulic pressure chamber;

a seal member mounted to said lower support piece and encapsulating said second diaphragm, said separating plate and said third hydraulic pressure chamber being arranged such that said separating plate is held between said third hydraulic pressure chamber and said first diaphragm and said first diaphragm is held between said separating plate and an inner support rim of said seal member, said seal member having an orifice formed therein on an opposing side of said first diaphragm from said separating plate;

a rubber gasket absorbing member positioned on an upper surface of said first hydraulic pressure chamber;

an intermediate supporting piece positioned between said rubber absorbing member and said upper support piece;

means for fixing said upper support piece through said intermediate supporting piece to said first hydraulic pressure chamber;

means for sensing a vibration of said lower support piece relative to the vehicle body;

a solenoid valve formed in said third hydraulic pressure chamber and having a normally opened valve for supplying hydraulic pressure from said pump to said first chamber through said means for fluidly connecting; and means for controlling said hydraulic pump and said solenoid valve in response to at least a frequency of vibration detected by said means for sensing a vibration, whereby variations in hydraulic fluid supplied to said second and third hydraulic pressure chambers bidirectionally compensate for the supply of hydraulic fluid pressure to said first hydraulic pressure chamber such that said first hydraulic pressure chamber dampens an engine vibration from said lower support piece to said upper support piece.

2. The hydraulically controlled engine mounting device according to claim 1, wherein said means for fluidly connecting is an orifice.

3. The hydraulically controlled engine mounting device according to claim 1, wherein said means for fixing is bolt and a nut.

4. The hydraulically controlled engine mounting device according to claim 1, wherein said means for sensing is a sensor.

5. The hydraulically controlled engine mounting device according to claim 1, wherein said means for controlling is a controller.

6. The hydraulically controlled engine mounting device according to claim 1, wherein said hydraulic pump is a bidirectional type.

7. A hydraulic engine equipping device for a vehicle including:

first and second hydraulic pressure rooms divided by a partition and communicating with each other by a passageway to damp vibration of an engine of said vehicle with a fluid friction, the device comprising:

a third hydraulic pressure room formed near said first hydraulic pressure room;

said third hydraulic pressure room communicating with said first hydraulic pressure room by a passage-aperture having a solenoid valve; and a hydraulic pump formed on a predetermined position of said third hydraulic pressure room;

said solenoid valve and hydraulic pump being operated by a controller judging a vibration frequency transmitted to a vehicle body of said vehicle to charge an internal hydraulic pressure of the first hydraulic pressure room and dampen the vibration transmitted to the body.

8. The hydraulic engine equipping device according to claim 1, wherein said third hydraulic pressure room has a limited volume by a diaphragm formed therein.

9. The hydraulic engine equipping device according to claim 7, wherein said hydraulic pump is a bi-directional type pump.

10. The hydraulic engine equipping device according to claim 1, wherein the solenoid valve is a constant-open type valve.

* * * * *